United States Patent [19]

Kinoshita et al.

[11] Patent Number: 5,215,019
[45] Date of Patent: Jun. 1, 1993

[54] TRANSPLANTING EQUIPMENT

[75] Inventors: Eiichiro Kinoshita; Shiro Asano; Tamaki Kubo, all of Ehime, Japan

[73] Assignee: Iseki & Co., Ltd., Ehime, Japan

[21] Appl. No.: 892,645

[22] Filed: Jun. 2, 1992

Related U.S. Application Data

[63] Continuation of Ser. No. 762,248, Sep. 19, 1991, abandoned, which is a continuation of Ser. No. 495,960, Mar. 20, 1990, abandoned, which is a continuation of Ser. No. 337,975, Apr. 14, 1989, abandoned, which is a continuation of Ser. No. 150,411, Feb. 9, 1988, abandoned.

[30] Foreign Application Priority Data

| Apr. 10, 1986 | [JP] | Japan | 61-83773 |
| Aug. 25, 1986 | [JP] | Japan | 61-199843 |
| Aug. 25, 1986 | [JP] | Japan | 61-199844 |
| Aug. 25, 1986 | [JP] | Japan | 61-199845 |
| Nov. 27, 1986 | [JP] | Japan | 61-283601 |

[51] Int. Cl.⁵ .................................................. A01C 11/02
[52] U.S. Cl. ........................................ 111/104; 111/89
[58] Field of Search .................... 111/2, 3, 89, 91, 92, 111/97, 86, 104, 105

[56] References Cited

U.S. PATENT DOCUMENTS

| 740,091 | 9/1903 | Cole | 111/86 |
| 964,820 | 7/1910 | Snyder | 111/3 |
| 2,068,828 | 1/1937 | Tustain | 111/89 X |
| 3,115,058 | 11/1964 | Valdi | 111/3 |
| 3,176,635 | 4/1965 | Mabon | 111/3 |
| 4,111,135 | 9/1978 | Broun et al. | 111/2 |

FOREIGN PATENT DOCUMENTS

| 2432265 | 2/1980 | France | 111/2 |
| 1268125 | 11/1986 | U.S.S.R. | 111/2 |

Primary Examiner—Danton D. DeMille
Attorney, Agent, or Firm—Armstrong, Westerman, Hattori, McLeland & Naughton

[57] ABSTRACT

A transplanting machine or equipment for taking seedlings of vegetables or the like from a seedling table 13 and planting them in a field. The machine has a transmission mechanism including a transmission case, a first rotary case (32) driven by a driving device and a second rotary case (33) which rotates reversely to the first rotary case. The rotary cases are linearly extended in a vertical direction while they overlap in contracted form in a longitudinal or horizontal direction. A seedling transplanting tool is carried by the second rotary case. The seedlings are easily removed from a seedling table located at a high position on the machine and transplanted without extending the length of the transplanting equipment in the longitudinal or horizontal direction.

2 Claims, 13 Drawing Sheets

FIG.14

TRANSPLANTING EQUIPMENT

This application is a continuation of application Ser. No. 762,248 filed Sep. 19, 1991, now abandoned, which in turn is a continuation of application Ser. No. 495,960, filed Mar. 20, 1990, now abandoned, which in turn is a continuation of application Ser. No. 337,975, filed Apr. 14, 1989, now abandoned, which in turn is a continuation of application Ser. No. 150,411, filed Feb. 9, 1988, now abandoned.

FIELD OF THE INVENTION

This invention relates to a transplanting equipment such as a rice transplanter and a vegetable transplanter.

BACKGROUND OF THE INVENTION

A conventional transplanting equipment was structured, as disclosed in the Japanese Examined Patent Publication Sho. 49-17806, and the Japanese Unexamined Patent Publication Sho. 60-66907 or Sho. 61-5712, in such a way that a transplanting tool was installed on the side of the front end of a single rotary case so that a transplanting claw of the transplanting tool might draw a long loop-shaped transplanting trajectory in the vertical direction as seen from the side.

In said conventional transplanting equipment, the transplanting trajectory drawn by the transplanting claw of the transplanting tool was short in the longitudinal direction so that it could not be stretched in the vertical direction, and if attempted to extend in the vertical direction, the longitudinal distance increased and the transplanting machine length became longer, which prevented the transplanting equipment from becoming compact. Besides, as the transplanting trajectory became long in the longitudinal direction, the transplanting claw moved back and forth longer under the soil surface in transplanting, so that the transplanted position of the seedlings were influenced and impaired.

DISCLOSURE OF THE INVENTION

To solve the above problems, the transplanting equipment of this invention is composed as follows.

This is designed in such a way that, outside the front end of the rotation on a first rotary case which is driven as the occasion may demand, a second rotary case which rotates in the reverse direction of the first rotary case is mounted, and the second rotary case is structured as to be positioned on the same side of the first rotary case directed to the vertical direction when the first rotary case is directed to vertical direction, and to the contrary, on the other side of the first case directed to the horizontal direction in the same way as the first rotary case when the first rotary case is directed to the first rotary case, and a seedling transplanting tool is attached outside the front end of the second rotary case.

According to this invention, the second rotary case rotates reversely with regard to the rotation of the first rotary case, and as seen from the side, these two cases are linked in the vertical direction to be extended vertically, and are contracted as a whole in the longitudinal direction because they overlap with each other. As a result, the loop-shaped transplanting trajectory drawn by the transplanting claw of the transplanting tool can be shortened longitudinally and extended in the vertical direction. Accordingly, seedlings can be surely divided from a seedling table installed even in a fairly high position and be transplanted in a preferable position without being stretched back and forth by the soil surface beneath.

DESCRIPTION OF THE PREFERRED EMBODIMENTS OF THE INVENTION

An embodiment of this invention is explained in detail by referring to the drawings hereafter.

Reference numeral 1 designates a transmission gear case, on both right and left sides of which wheel transmission cases 2, 2 are mounted to extend downward, and 3 is a transmission case installed to extend backward in an intermediate part slightly to the left side of the transplanter.

In engine 4 is directly coupled to the forward side of the transmission gear case 1.

Wheels 5,5 support the transplanter.

Figure 1:
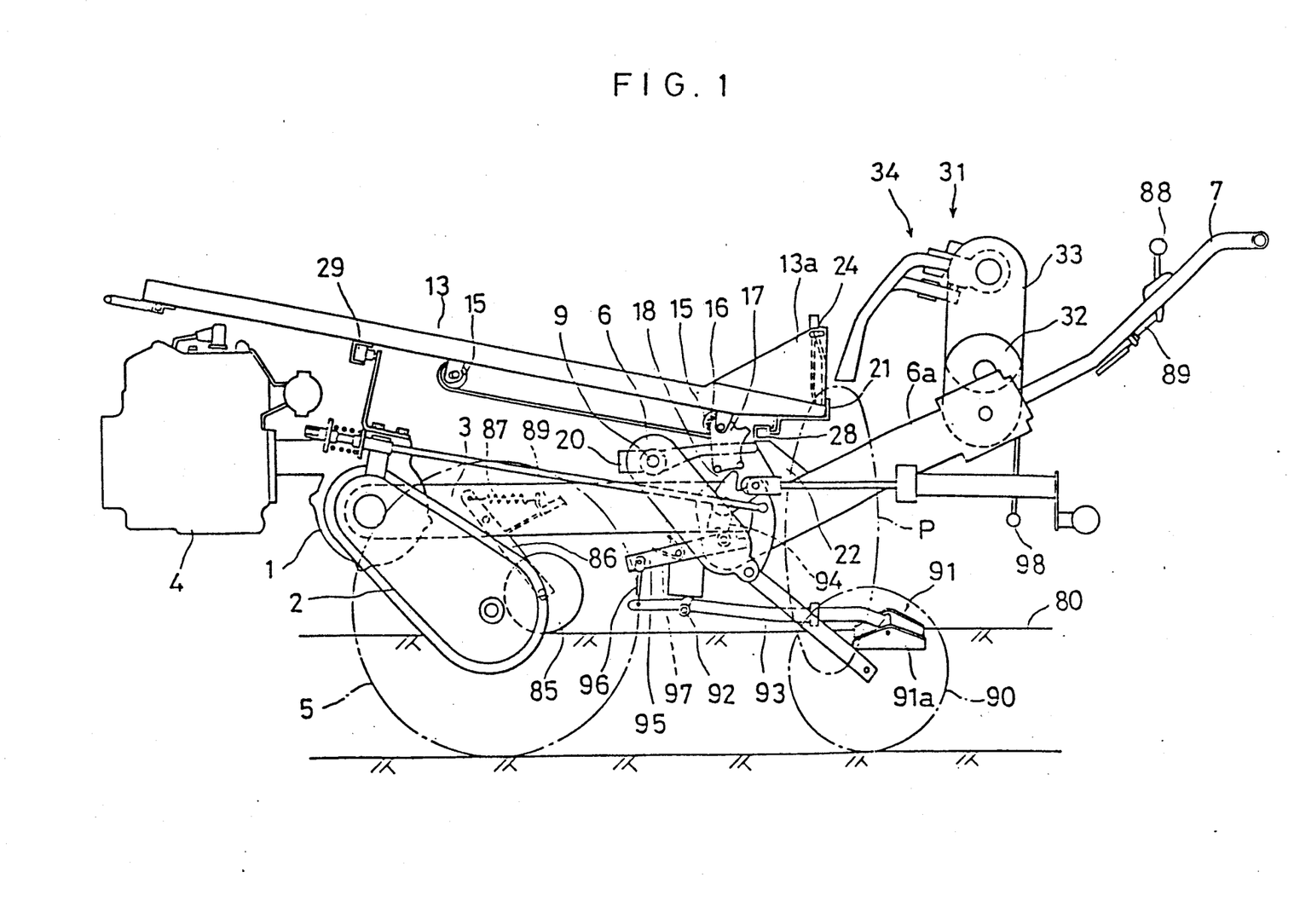
FIG. 1 is a side elevation view showing a preferred embodiment of this invention.
Figure 2:
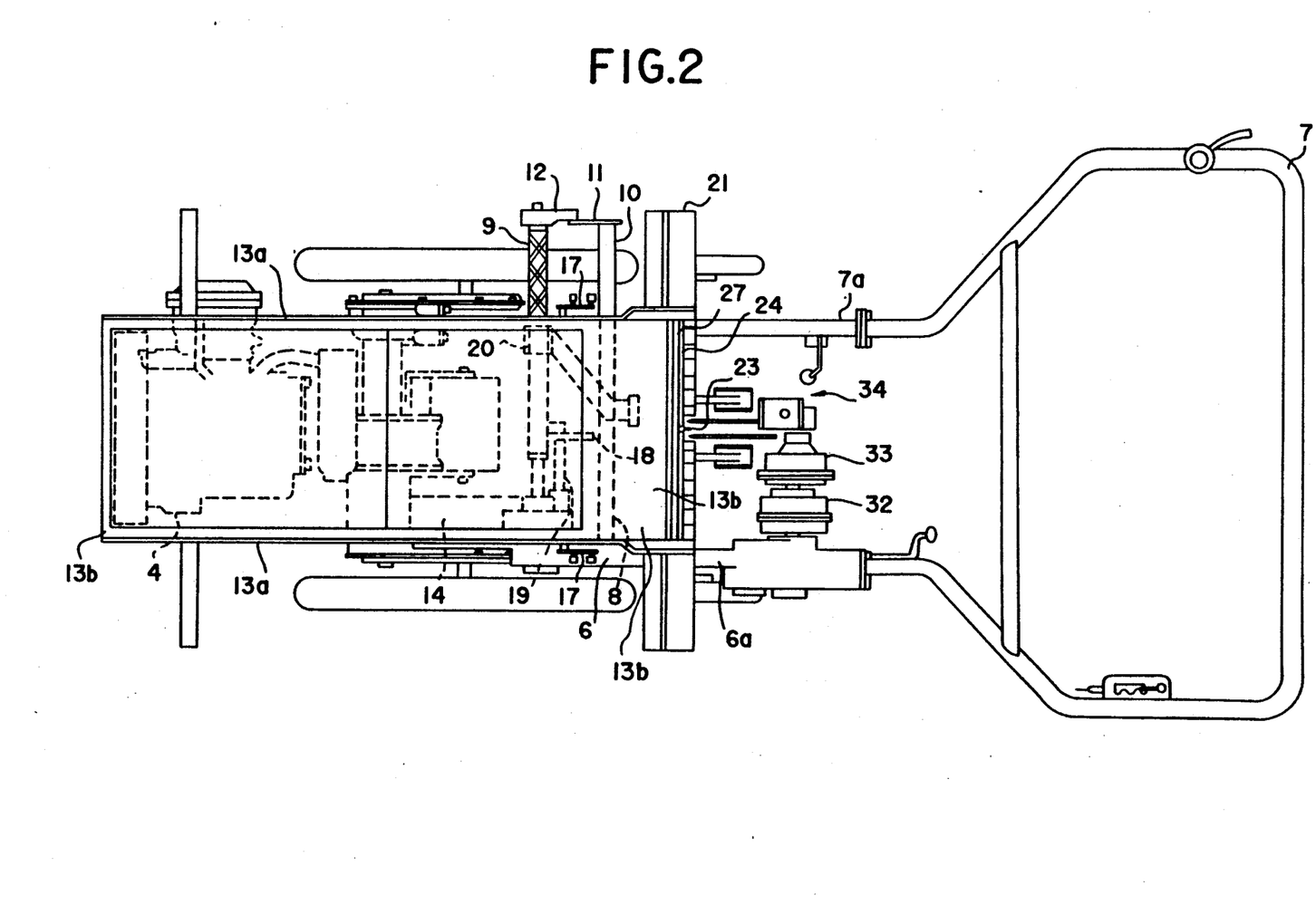
FIG. 2 is a plan view.

A transplanting transmission case 6 is attached outside the front end side of the transmission case 3, which is in a V-shape as seen from the side in FIG. 1 and an extension 6a of the transmission case 6 extends rearward.

A handle 7, provided in a loop shape, connects a handle support rod 7a with a rear end of the transmission case 6a. Although not shown in the drawings, a forward end of the support rod 7a is attached to the right side of the transmission gear case 1.

A support rod 8 rigidly connects the transplanting transmission case 6 and the handle support rod 7a with each other.

A lead cam shaft 9 is rotatably mounted at one end in a front side of the transmission case 6 and rotated by the transmission. The other end of the shaft 9 is rotatably supported by a metal plate 12 mounted to a fitting 11 on a support rod 10 which is integrally attached to the support rod 8.

A seedling table 13 includes a seedling transfer belt 14 stretched in the longitudinal direction in a space between right and left frames 13a and front and rear bottom plates 13b.

Reference numerals 15 designate belt winding rolls.

The rear belt winding roll 15 is designed to be driven through a ratchet mechanism, and 17 denotes its driving levers mounted on the right and left side.

A pivot member 18 is mounted on a shaft for movement to engage the lead cam shaft 9 with the transmission in case 6 and thus provide rotary power to drive the lead cam shaft 9.

A lead metal or block 20 is carried by said lead cam shaft 9 and equipped with a lead claw which is engaged with a lead groove of the lead cam shaft 9. An arm which extends rearward from the lead block 20 is affixed to the rear bottom plate 13b of the seedling table 13.

It is so designed that the seedling table 13 is reciprocally and lateraly moved from the left to the right by the rotation of the lead cam shaft 9 through the lead metal block 20, and when the seedling table comes to the lateral end of a movement, the driving lever 17 is engaged with the lever 12" to be rotated so as to rotate the belt winding roll through a ratchet mechanism 16.

A seedling receiving frame 21 is located on the rear end side of said seedling table 13 and is mounted on said transplanting transmission case extension 6a and the handle support lever 7a by a support fitting 22. A seedling outlet 23 is provided at the middle part of both the right and the left sides of the seedling receiving frame.

A horizontal shaft 24 is a fixed to the right & left standing frames 13a on the upper side of the seedling table on each side of the seedling supply outlet. Holes are drilled in the vertical direction on the shaft 24 with a certain interval, in which stopper levers 25, 25 . . . are inserted and fixed to receive the intermediate part of pot a of pot seedling A.

A brush 26 is hung with its base side supported in a horizontal frame 27 fixed on the upper part of the standing frames 13a on the right and left sides of the seedling table on the side of the seedling supply outlet. which is positioned in front of said stopper levers 25, 25 . . . .

Reference numerals 28, 29 denote support rails of the seedling table 13.

A transplanting device 31 comprising a first rotary case 32 which is attached to be swung to by the driving shaft on the side of said transplanting transmission case 6c, a second rotary case 33 which is swung at twice the speed reversely to the first rotary case with its base part mounted outside the front end side of the first rotary case 32, and a transplanting tool 34 attached to the front part of the outer side of the second rotary case 33.

A driving shaft 37 is mounted and borne rotatably inside the front end side of said transplanting transmission case 6, and on the driving shaft 37, a sprocket 38 receiving the power from an engine 4 through a chain 37a, a gear 39 and a gear 40 are installed so as to be integrally rotated with the shaft.

A shaft 41 is borne rotatably on said transplanting transmission case 6, and carries a gear 42 meshing with said gear 40.

A shaft 43 is inserted in the shaft 41, in the case of this drawing, which is installed so that its one end is supported rotatably on the inner wall at one side of the transplanting transmission case 6, and that the other end is projected from said outfitted shaft 41 on the outer side of the transplanting transmission case 6.

And to the shaft 43, a gear 44 meshing with said gear 39 is attached rotatably together with the shaft.

The inner part of the first rotary case 32 is penetrated by said shaft 43 from one side, and the outer side of which is mounted on the shaft 43 by a pin 45a through a metal 46.

A gear 47 is integrally mounted on said outfitted shaft 41 and arranged in said first rotary case 32. A stationary shaft 48 penetrates the inner part on the front end side of said first rotary case and is affixed on the first rotary case 32 by a metal 49 and a pin 50 at the side thereof. A cylindrical shaft 51 rotates around said stationary shaft 48. A gear 52 meshing with said gear 47 is integrally mounted on the shaft 51.

A second rotary case 32, the outer side of which base side is fixed on said cylindrical shaft 51 by a pin 54 and a metal 55. The fixed shaft 48 is inserted in the second rotary case 33.

A gear 56 is affixed to the stationary shaft 48 in the second rotary case 33. A counter gear 57 and a rotary gear 58 of a transplanting tool mounting shaft 59 are also provided. The transplanting tool mounting shaft 59 is projected outside the front end side of the second rotary case 33, to which a transplanting tool 34 is attached.

The transplanting tool 34 is composed in such a way that a transplanting fixed claw 61 comprising a transplanting fixed claw 61a and a transplanting movable claw 61b is installed in a hollow box-shaped main body case 60 of the transplanting tool and that the actuation mechanism of said transplanting movable claw 61b is installed in the transplanting tool main body.

A case 60 of the transplanting tool 34 is affixed to said transplanting tool mounting shaft 59 by fittings, keys, cotters, and pins.

The transplanting movable claw 61b is attached to a vertical shaft 66 installed rotatably on said case 60, so that the spacing of the right and left can be extended or contracted freely with regard to the transplanting fixed claw 61a bolted to said case.

An opening cam 67, which is integrally installed on an outfitted shaft 68 covering said transplanting tool mounting shaft 59, and the outfitted shaft 68 is integrally attached to said second rotary case 33.

A cam follower 69 is affixed on said shaft 66 and pressed toward said opening cam 67 by a spring 70 so that the shaft 66 is rotated by the rotation of the cam 67.

It is so designed that the rotation speed of the second rotary case 33 becomes exactly twice that of said first rotary case 32, and that the both rotary cases 32, 33 extend approximately to the vertical direction when the both rotary cases 32, 33 are fully extended linearly while the both rotary cases 32, 33 extend in a longitudinal direction when they are not fully extended in a straight line but in a bent shape.

The trajectory P drawn by the tip of the transplanting claw of the transplanting tool 34 is created in a closed loop shape narrower in the longitudinal direction and longer in the vertical direction.

The motion of the movable transplanting claw 61b is to rotate to the side of the fixed transplanting claw 61a against a spring 70 when the transplanting claw enters from above into the seedling outlet 23 of said seedling receiving frame to take out the seedlings, and after that to reach the lower end in that state, and then to be opened when poking into the soil owing to the shape of said cam 67.

The transmission mechanism of said transplanting tool 34 is as shown above, where the transmission ratio of the gears is as follows. That is, gear 40:gear 42=3:1, gear 39:gear 44=1:1, gear 47:gear 52=1:1, gear 56:gear 58=1:2. This transmission ratio is just one of the examples and when gear 56:gear 58=1:2, if gear 47:gear 52 is set as 2:1, gear 40:gear 42 becomes 2:1 and gear 39:gear 44 becomes 1:1 or when gear 56:gear 58 is 1:2, if gear 47:gear 52 is set 1:2, gear 40:gear 42 should be 5:1 and gear 39:gear 44 should be 1:1.

According to the transmission mechanism of the transplanting tool 34 in the above example, the first rotary case 32 is rotated by the shaft 43 clockwise, and by contrast, the second rotary case 33 is rotated by the cylindrical shaft 51 counterclockwise, and furthermore, the transplanting tool 34 is rotated by the gear 58 which is subjected to planetary rotation by a sun gear 57 substantially affixed to the first rotary case 32 while deflecting from the second rotation case 33 and keeping almost the same position seen from the side. Accordingly, the first rotary case 32 and the second rotary case 33 are driven by gears in opposing directions, so that the loosening caused by the backlash due to the gear transmission rarely appears and that seedling division by the transplanting tool 34 can be carried out precisely.

Figure 5:
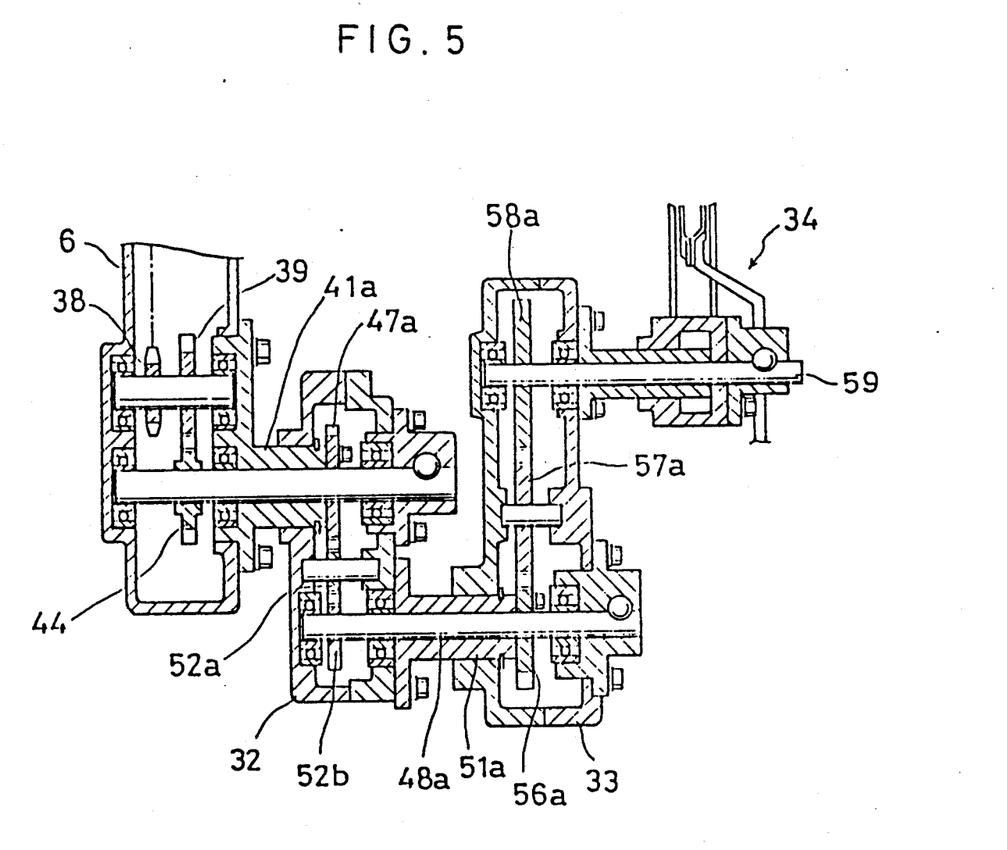
FIG. 5 is a sectional view showing a transmission mechanism of another embodiment.
Figure 6:
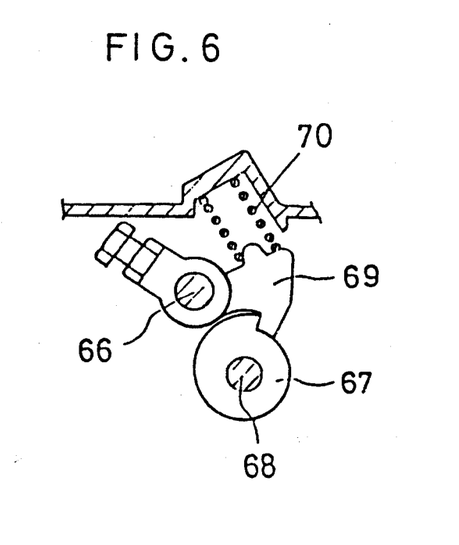
FIG. 6 is an explanatory drawing of an opening device of a transplanting claw.
Figure 7:
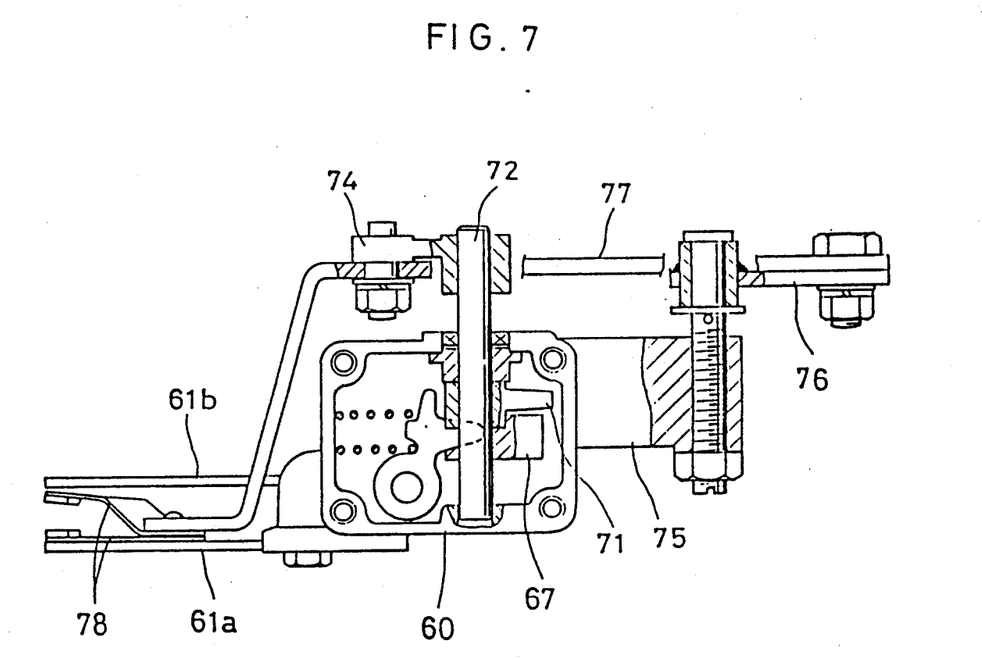
FIG. 7 is a plan view of a seedling press-down mechanism.
Figure 8:
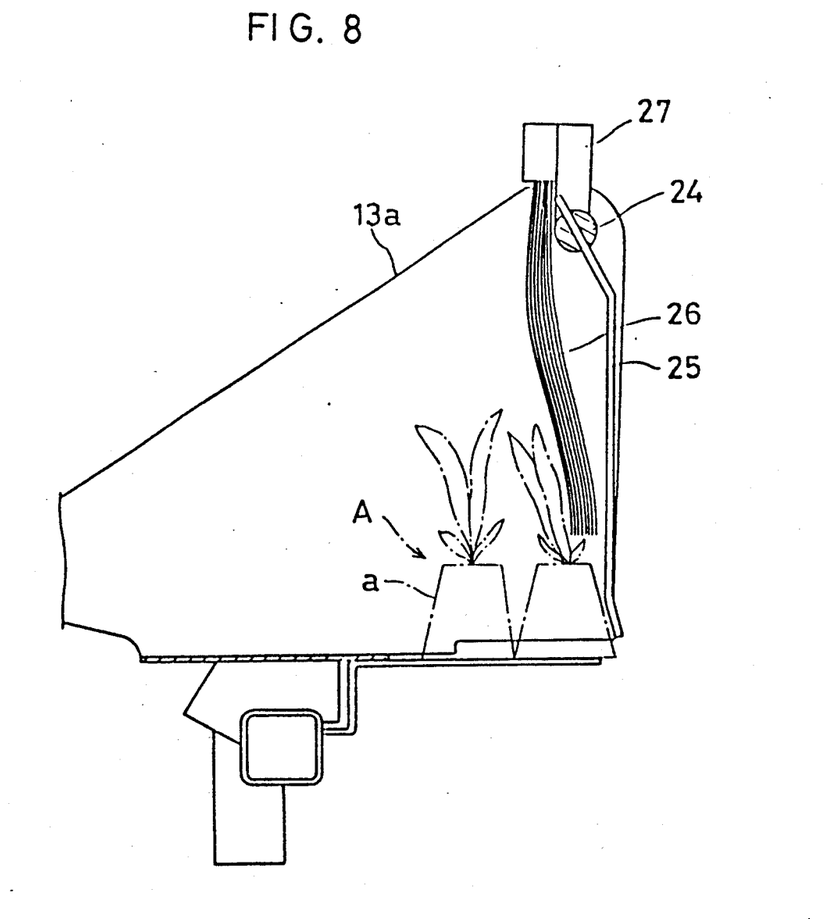
FIG. 8, FIG. 9 and FIG. 10 are a side elevation, plan and rear view of the rear part of seedling table respectively.
Figure 9:
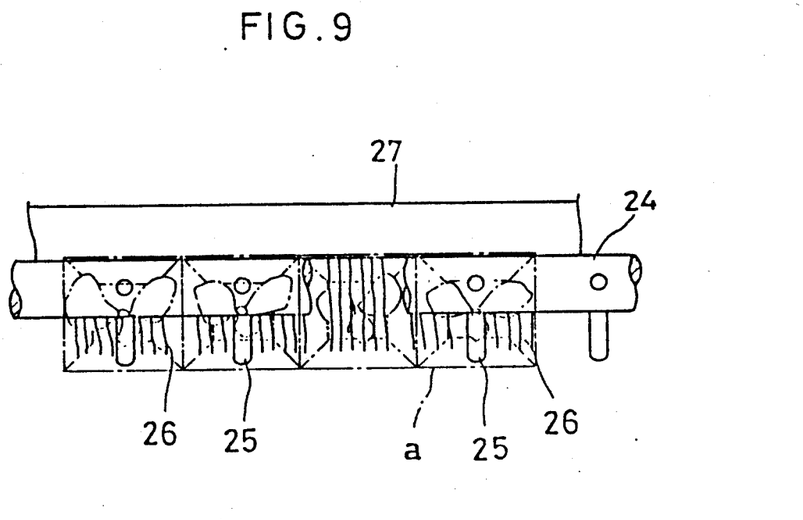
Figure 10:
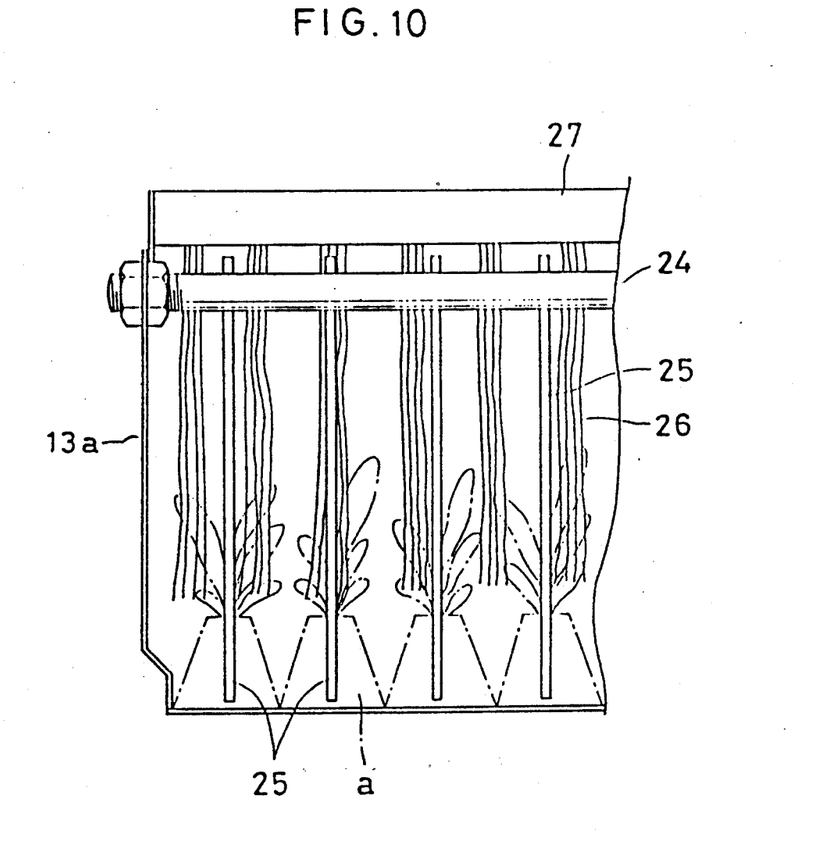
Figure 11:
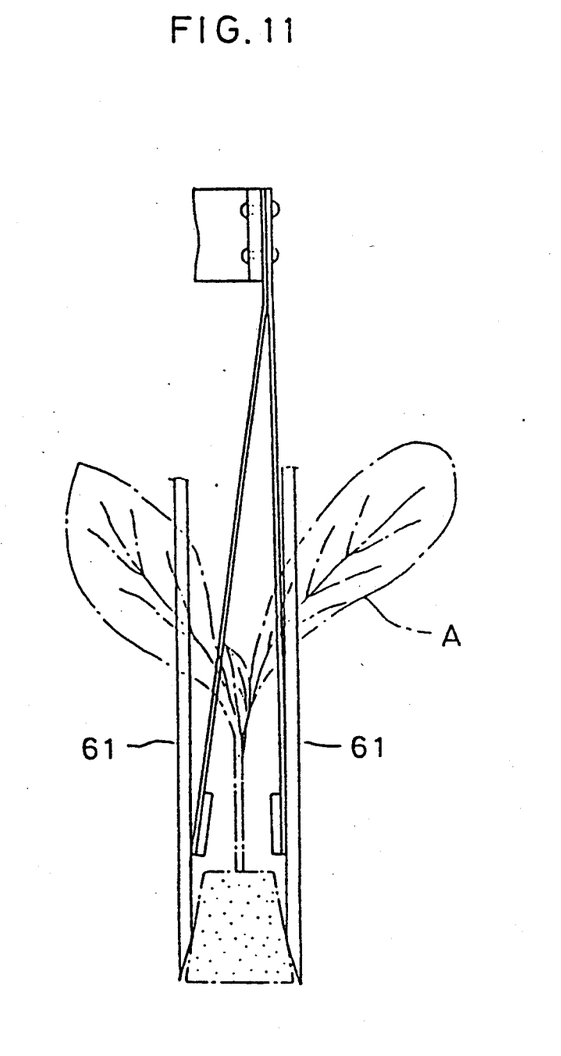
FIG. 11 is a front view of the transplanting claw.

Referring now to FIG. 5, another example of a transmission mechanism of the transplanting tool 34 is described herein.

Figure 3:
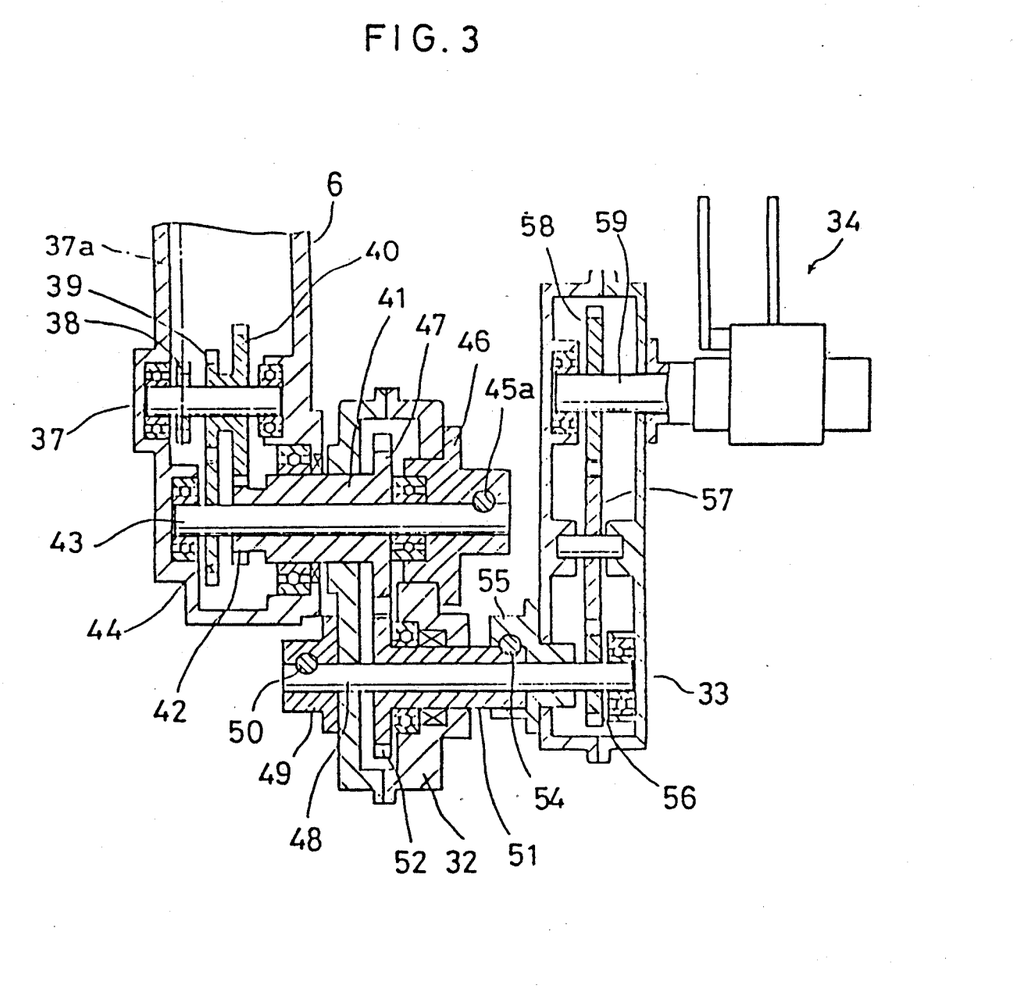
FIG. 3 is a sectional view showing a transmission mechanism.
Figure 4:
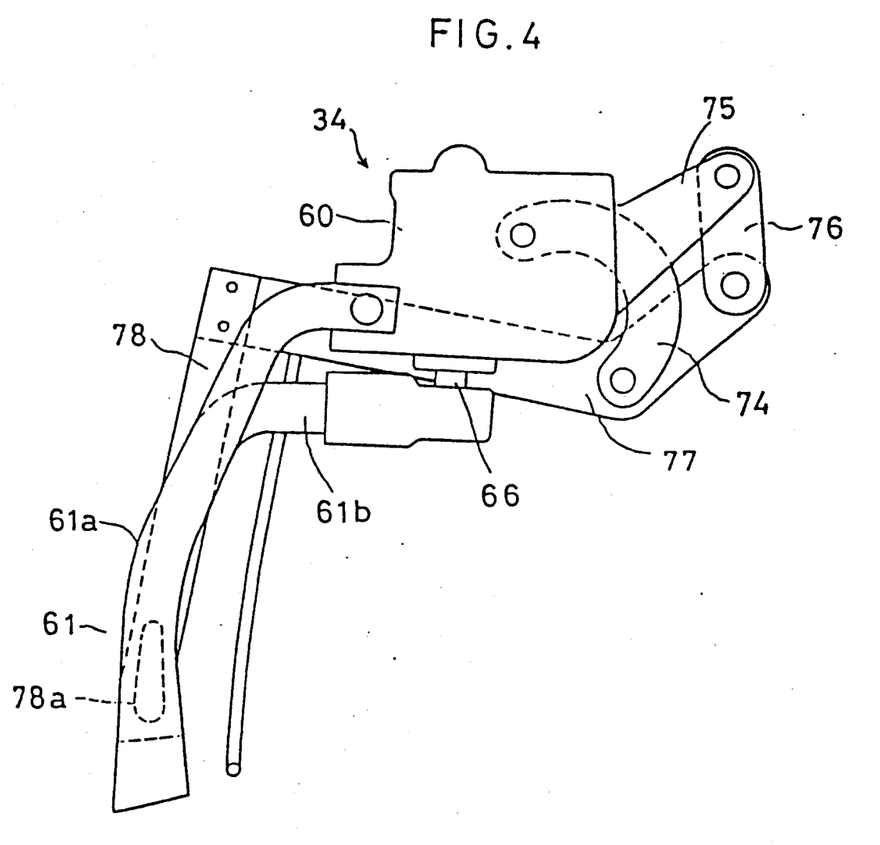
FIG. 4 is an illustration of the transplanting tool.

Describing the different points from said example shown in FIG. 3, an outfitted shaft 41a is affixed to a transplanting transmission case 6, which composes a sun gear with its integral gear 47, and moreover to which a planetary gear 52b is installed through a counter gear 52a. A second rotary case 33 is mounted rotatably by a shaft 48a being integral with the planetary gear 52b and a cylindrical shaft 51a to which the shaft 48a is inserted is attached to a first rotary case 32. One the cylindrical shaft 51a, furthermore, a gear 56a is mounted as a sun gear. It is constructed so that a planetary gear 58a is driven by the gear 56a through a counter gear 57a, and a transplanting tool 34 is attached to a transplanting tool mounting shaft 59 being integral with the gear 58a.

In this case, the transmission ratio of the gears is set as gear 39:gear 44=1:1, gear 47a=gear 52b=2:1, and gear 56:gear 58a=1:2. Here, also in this embodiment, it is so designed that the first rotary case 32 is rotated clockwise, while the second rotary case 33 is rotated counterclockwise.

In this constitution, it is designed in such a way that the transmission system of the shaft 59 to keep the position of the transplanting tool 34 in a certain state is driven by the sun gear 56a fixed to the first rotary case 32 itself, so that the looseness in action of the transplanting tool 34 can be lessened and that the structure can be simplified.

Figure 14:
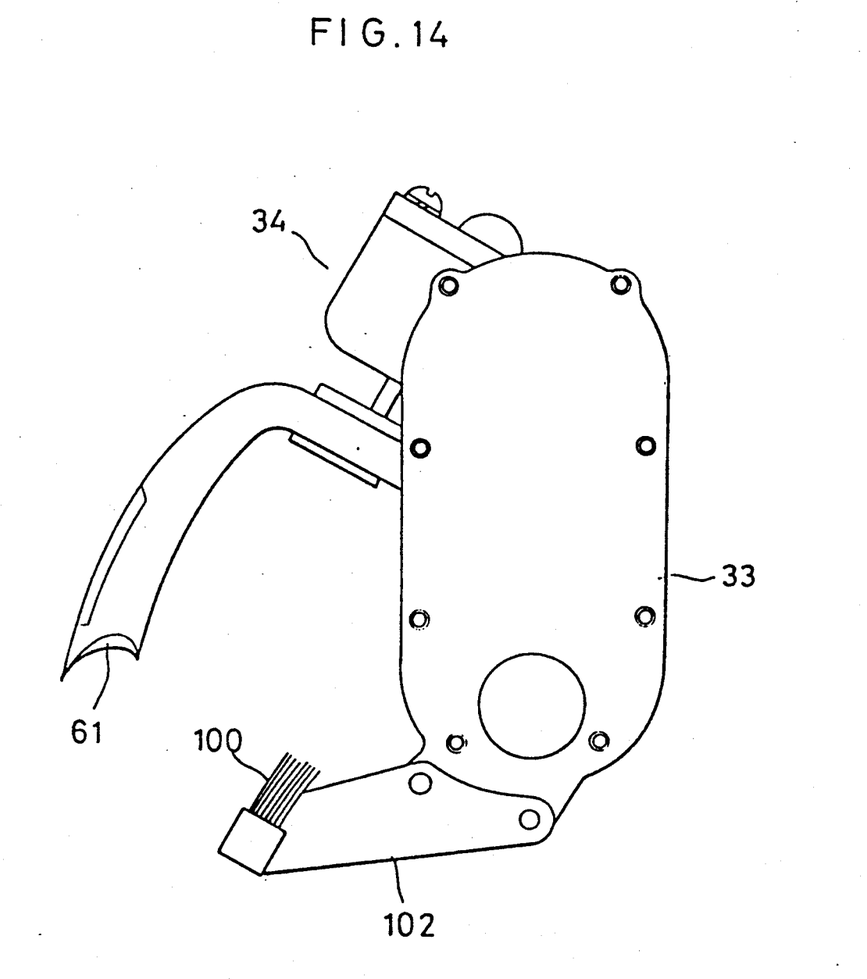
FIG. 14 is an explanatory drawing of a mud scraper.

Here, as shown in FIG. 14, it is preferable to install a mud scraper 100 made of a brush on the end part of base side which is the rotation center side of the second rotary case 33 through a bracket 102 so as to scrape off the mud adhered on the transplanting claw 61. The mud scraper is mounted eccentrically on the antirotation direction side of the second rotary case 33, which is so designed as to contact with the transplanting claw on the moving trajectory of the transplanting claw 61.

A seedling press-down mechanism is explained below. An extrusion cam 71 is mounted on the transplanting mounting shaft 59 arranged together with the opening cam 67 in the case 60 of said transplanting tool 34, and the cam 71 is installed on an extrusion driving shaft 72 borne parallel with said shaft 59 so that the extrusion driving shaft 72 rotates normally or reversely depending on the rotation of the cam 71.

An end of the extrusion driving shaft 72 is projected from said case 60, and an oscillating fitting 74 is affixed on the projected part of the shaft. A rocker arm 76 is mounted on a bracket 75 being integral with the case 60 on the rear side of the case 60, and furthermore, the base part of an extrusion mounting lever 77 to mount an extruding element is pivoted on said rocker arm 76 while its middle point in the longitudinal direction is pivoted on the oscillating fitting 74 so that the front end side of the extrusion mounting lever 77 is temporaily oscillated vertically.

In consequence, the base part of seedling extruding elements 78, 78' composed of leaf springs as an elastic member is fixed on the tip of the extrusion mounting lever 77, and the tips of the seedling extruding elements 78, 78 are so designed as to be always press-fitted on the lower end side of the inner wall of said fixed transplanting claw 61a and the movable transplanting claw 61b. As a result, when the claws 61a and 61b are spaced from each other by the action of the movable transplanting claw 61b, the seedling extruding elements 78 are simultaneously opened along with its opening, and shut when it is closed in the same way.

A pressure roller 85 is also provided to press and even out the surface of a ridge 80 where seedlings are to be transplanted. The roller 85 is pivoted rotatably on an arm 86 pivoted on a machine frame, and a spring 87 is interposed between the arm 86 and the machine frame to elastically lower the pressure roller 85. It is so designed that the descending limit position of the pressure roller 85 can be adjusted by an adjusting lever 88 mounted on a handle 7 through a wire 89, and the transplanting depth can be, hence, adjusted.

Tail wheels 90 are installed right and left at the position to straddle the ridge 80 so that its position can be vertically adjusted by the rotation of an adjusting handle.

Root pressure members 90 press the surface of the ridge 80 near the root of transplanting seedlings, and are distributed laterally from the lateral center of the ridge 80. A pressure plate 91a is mounted rotatably on the rear end side of an arm 93 of which longitudinal middle point is pivoted on a pin 92 which is inclined to the machine frame so that the right and left outer sides may direct downward, and the front end side of the arm 93 is interlocked through a rod 96 with an oscillating lever 95 oscillated by a cam 94 attached to said rotary shaft 19, so as to compose a two-motion presser in which the pressure plate 91a lightly presses the surface of the ridge on both sides of the transplanted seedlings at first, and sequentially presses strongly.

Reference numeral 97 denotes a spring.

Figure 12:
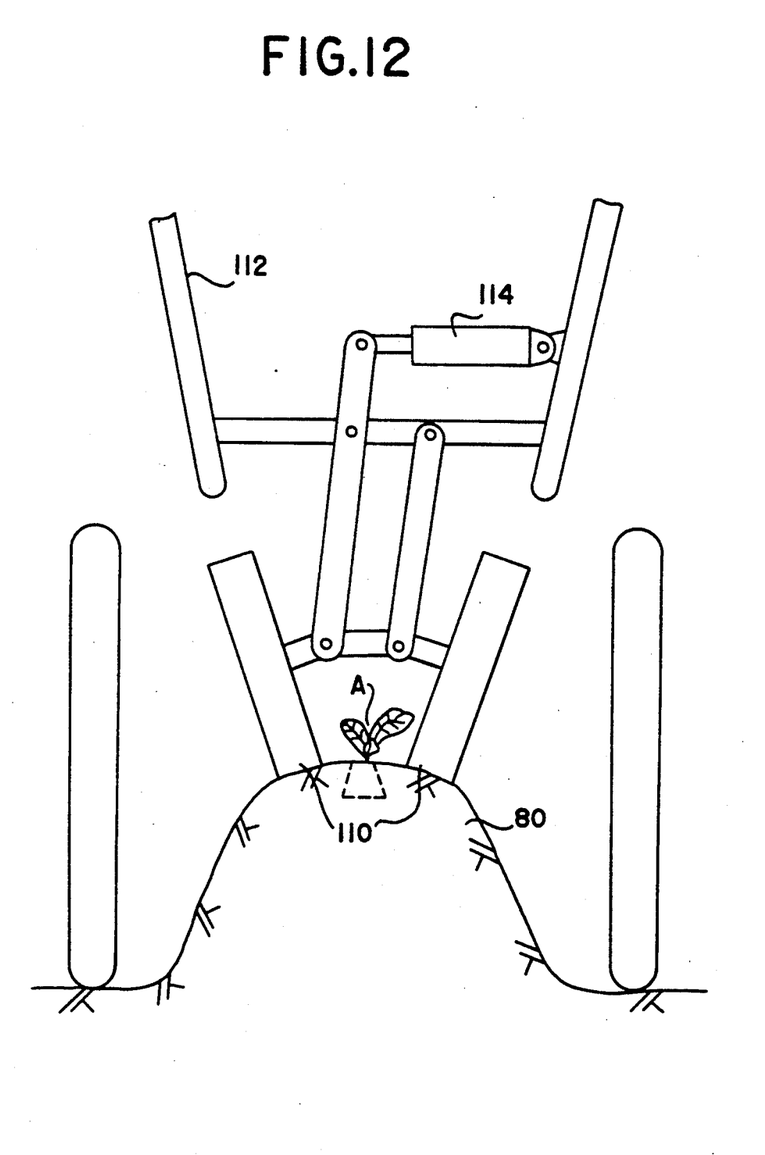
FIG. 12 and FIG. 13 are a rear view and a plan view of the root pressure rings respectively.
Figure 13:
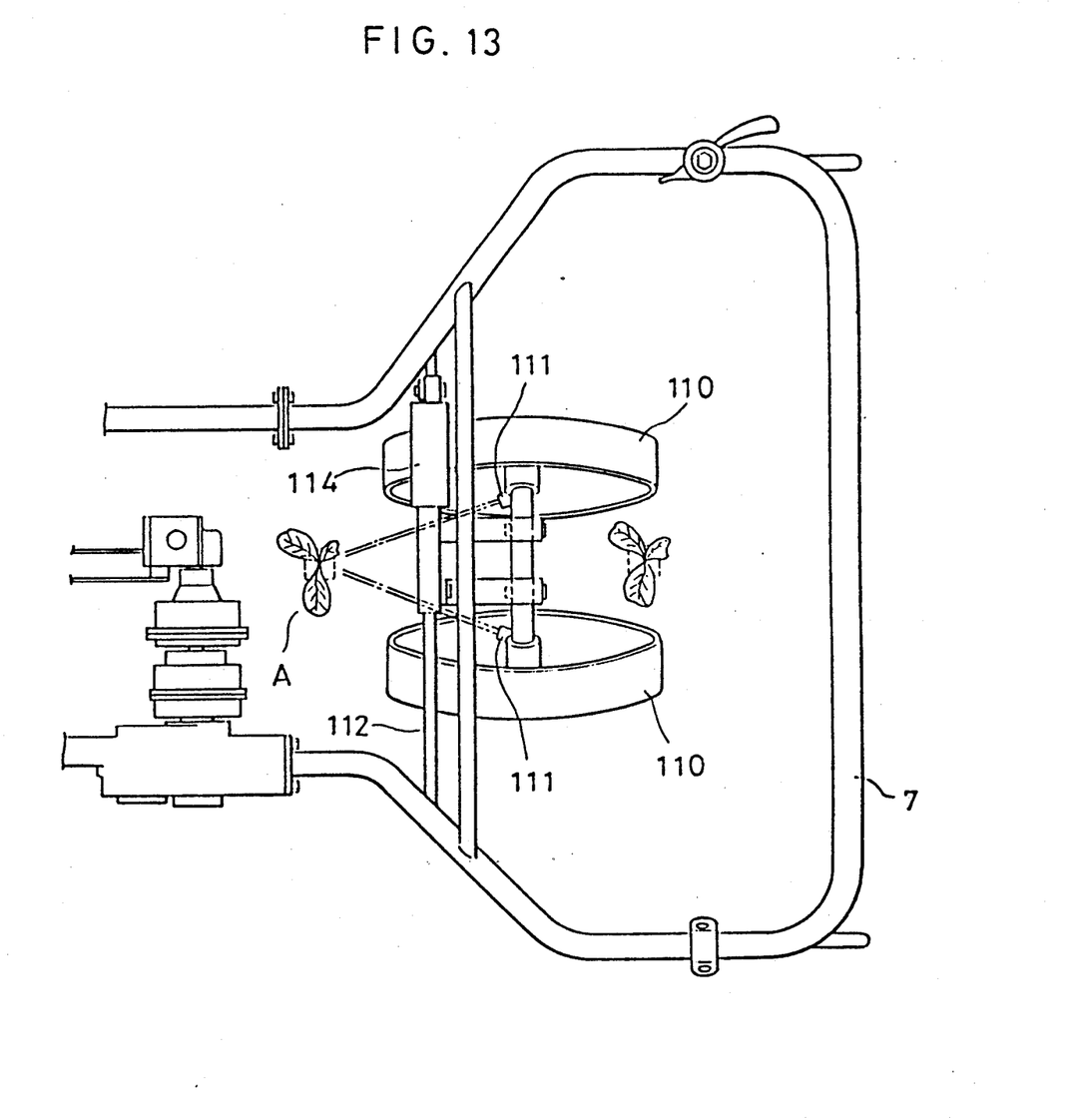

Here, it is acceptable to install a pressure equipment having a root pressure ring 110 as shown in FIG. 12 and FIG. 13 instead of the above tool pressure member 91. The equipment is designed in such a way that pressure rings 110, 110 are supported on a frame 112 affixed on the handle 7, and that the position of seedling A is detected by a position detector 111 such as an ultrasonic sensor or a photoelectric sensor. The root pressure ring 110 is actuated by the action mechanism such as a hydraulic equipment 114 depending on a signal from the detector, the root of seedlings a is hence, pressured. In the equipment shown in the illustrated example, as a pair of position detectors 111 are installed on the right and left, a lateral deflection of the seedling position can be detected by comparing the signals from these sensors by a comparator. The hydraulic equipment 114 is actuated approximately depending of the detected result, so that the soil of the seedling root can be pressured adequately.

An intrarow spacing marker 98, which is structured in such a way that, when transplanting error occures, by returning the machine body back to the position above the transplanted seedling, and restarting, the first seedling after the restart is transplanted at the same interval.

Operation of the above example is now explained. After setting the transplanter with its wheels 5, 5 straddling the transplanting ridge in the field, seedlings A in the state of mat with soil or seedling A in he state of pot grown up in a paper-made raising device of seedling in which pot vessels are linked laterally and longitudinally at a certain interval are carried on the seedling table 13, and then, if the rotary parts are driven by an engine 4, the machine body advances by the rotation of the wheels 5, 5.

The seedling table 13 is reciprocally oscillated laterally by the rotation of the lead cam shaft 9 through a lead metal block 20. Accordingly, the seedlings A positioned on the rear end side are laterally moved in the state received by the seedling receiving frame 21, and thus the seedling is let out into the seedling outlet 23.

On the other hand, the shaft 43 is driven by the gear 39 and gear 44 when the shaft 26 is driven from the engine side through the chain 37a and sprocket 38. Then, the first rotary case 32 is rotated clockwise in FIG. 1 by the shaft 43.

The outfitted shaft 41 is driven by the gear 40 and gear 41, and the gear 47 affixed to the outfitted shaft 41 in the rotary case 32 is rotated at a high speed, so that the second rotary case 33 is rotated counterclockwise at a double speed by the gear 52 meshing with the gear 47. On the other hand, the transplanting tool mounting shaft 59 is rotated by the gear 56 of the shaft 48 installed in the first rotary case 32 through the counter gear 57 and the gear 58, and hence, the transplanting tool 34 affixed on the shaft 59 is rotated with deflection in the reverse direction of the rotation direction of the second rotary case 33 at the same speed; as a result the transplanting tool 34 vertically moves without changing its position.

The tip of the transplanting claw 61 attached to said transplanting tool 34 is moved while drawing a closed loop transplanting trajectory P.

In another case shown in FIG. 5, the first and the second rotary cases 32, 33 are rotated in the same way as described above and the action of the transplanting tool is also the same.

The transplanting claw 61 which draws such a transplanting trajectory P enters into the seedling outlet 23 of said seedling receiving frame 21 from the upper side, so that the seedling is pinched between the fixed transplanting claw 61a and the movable transplanting claw 61b.

At the time, the seedling extruding elements 78, 78 stay considerably above the bottom of the transplanting claw 61 in the waiting state, which is operated to the side where the movable transplanting claw 61b closes by the cam 67 and the cam floor 69, so that the seedling A is tightly pinched.

The seedling extruding element 78 abutting against the side of movable transplanting claw 61b is simultaneously operated to the closed side by the operation of the movable transplanting claw 61b.

The transplanting claw 61 is lowered in the state into the soil of the ridge, and at the same time, the movable transplanting claw 61b is opened outward. The pinched seedling A is, hence, substantially released in the soil to be transplanted, but when the adhering force with the transplanting claw 61 is strong, the seedling A is about to be lifted up by the ascent of the transplanting claw 61. At this point, the cam follower 73 is dropped in the step of the cam 71 by the elastic pressure of the spring so that the extrusion driving shaft 72 is rotated. The oscillating fitting 74 is sequentially rotated quickly and the seedling extrusion elements 78, 78 descend quickly through the extrusion mounting lever 77. As a result the inner wall of the transplanting claw 61 is scraped by its tip, and the seedling being about to be lifted up together is, thus, pressed into the soil. In this way, the seedling A can be surely transplanted without being lifted up and at the same time, the inner side of the transplanting claw 61 is cleanly swept so that a seedling can be certainly pinched at the next division of the seedlings.

It is preferable to drill holes 78a, 78a in the seedling extruding elements 78, 78 which prevent the mud from clogging the space with the transplanting claw 61.

As is described above, the surface of the ridge 80 to be transplanted is evened out by the pressure roller 85, and the seedling A is transplanted in a constant depth. Then, after the transplantation, the surface of the ridge around the root is certainly pressured by the root pressure member.

What is claimed is:

1. A transplanting machine having a transmission mechanism for moving a transplanting tool vertically and longitudinally relative to the machine comprising:

a transmission case (6) having a rotary output shaft, a first rotary case (32) adjacent said transmission case and fixed to said output shaft for rotation with said output shaft, said first rotary case comprising an elongated case having an output shaft spaced from and rotated by said transmission case output shaft, a second rotary case (33) adjacent to said first rotary case and fixed to said first rotary case output shaft for rotation with said first rotary case output shaft in a direction opposite to rotation of said first rotary case, said second rotary case comprising an elongated case having an output shaft spaced from and rotated by said first rotary case output shaft, and a transplanting tool (34) secured to said second rotary case output shaft, said transmission case output shaft and said rotary case output shafts being substantially parallel to each other, wherein said transplanting tool remains substantially vertical notwithstanding rotary movement of said second rotary case, and said elongated first and second rotary cases are vertically aligned and extended during operation of said transmission mechanism.

2. A transplanting machine as defined by claim 1 and further including a brush (100) mounted to said second rotary case (33) and positioned to brush a tip portion of said transplanting tool (34) during each cycle of rotary movement of said second rotary case (33) relative to said transplanting tool (34).

* * * * *